(No Model.)

W. G. RICHARDS.
CAR WHEEL.

No. 387,813. Patented Aug. 14, 1888.

Witnesses
James G. Greves.
William S. Blitz.

Inventor.
William G. Richards.

UNITED STATES PATENT OFFICE.

WILLIAM G. RICHARDS, OF BROOKLYN, NEW YORK.

CAR-WHEEL.

SPECIFICATION forming part of Letters Patent No. 387,813, dated August 14, 1888.

Application filed May 22, 1888. Serial No. 274,632. (No model.)

*To all whom it may concern:*

Be it known that I, WILLIAM G. RICHARDS, a citizen of the United States, residing at Brooklyn, in the county of Kings and State of New York, have invented an Improvement in Wheels for Railway-Cars, Locomotive-Trucks, and Tenders, of which the following is a specification.

My invention relates to what is known as the "built-up" class of wheels, comprising a wheel-center and a tire of steel or iron; and the purpose of my improvement is to combine a certain degree of elasticity with great strength in the wheel-center; to secure the tire thereto more firmly than has heretofore been done, and to secure the tire in such manner that it may be removed without injury to the wheel-center, and with the appliances usually found in railway repair-shops. I attain these objects by the construction illustrated in the accompanying drawings, in which—

Figure 3:
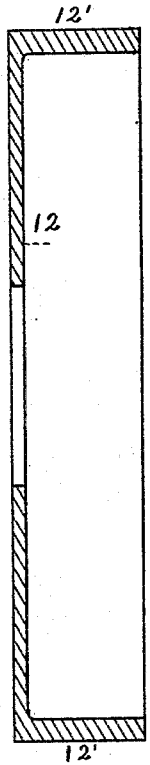
Figure 1:
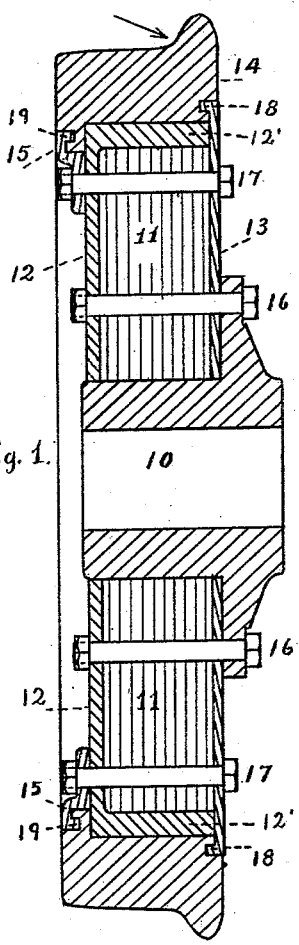
Figure 5:
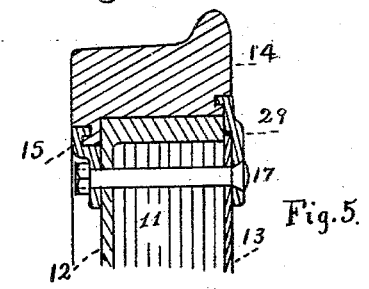
Figure 2:
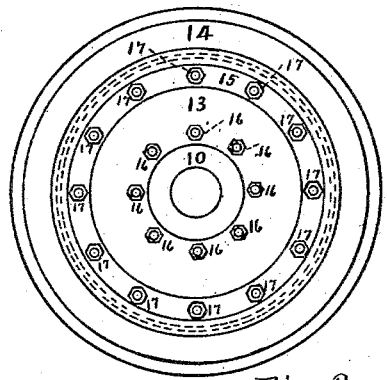
Figure 4:
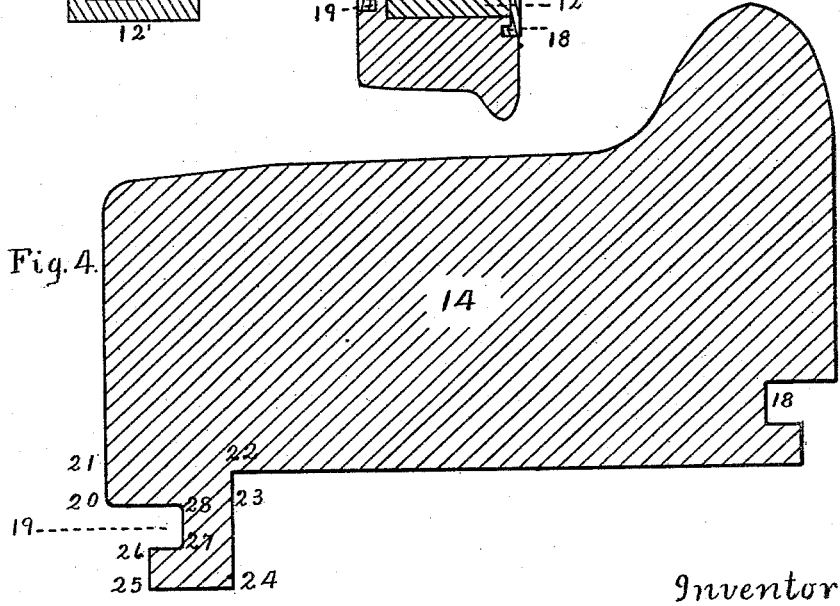

Figure 1 is a section through center of the wheel. Fig. 2 is a side elevation. Fig. 3 is a sectional view of the metallic case 12, which is in the form of a flanged annulus, and into which the body of the wheel-center is forced. Fig. 4 is a section of the tire 14, full size. Fig. 5 is a section showing a slightly different construction, a separate retaining-ring, 29, being used at the inner side of the tire in place of the flange 18 on disk 13, as shown in Fig. 1. I prefer to use, however, the construction as shown in Fig. 1.

Similar numbers refer to similar parts throughout.

My improved wheel consists of a tire, 14, and an independent wheel-center, the latter being composed of a hub, 10, a non-metallic wheel-body, 11, in the form of an annulus, inclosed by a metallic flanged annulus or case, 12, and seated firmly on hub 10, a metallic disk, 13, a tire, 14, of uniform section, seated upon the flange 12' of annulus 12, a forged retaining-ring, 15, an inner series of bolts, 16, and an outer series of bolts, 17.

To reduce the shock to rails and running-gear caused by passing at great speed over the uneven track of a railway, a somewhat elastic and non-metallic wheel-body, 11, is provided, which I propose to make of compressed paper or analogous material, protecting it from injury and such strains as it may receive by an inner metallic plate or disk, 13, and an outer plate, 12, having a flange, 12', which forms the periphery of the wheel-center. Numerous bolts and rivets being a source of weakness in a car-wheel, I make the plate 12 and flange 12' integral, instead of riveting the plate to a separate ring, as has heretofore been done.

The above-named parts, in conjunction with a hub, 10, and bolts 16, form a wheel-center, upon which a tire, 14, can be placed or removed without injury thereto by heating the tire until expanded sufficiently to free it from the center, the operation requiring no special machinery, and can therefore be performed in any railway repair-shop.

The tire 14, in addition to the constant strain received from the rail, is subject to severe transverse strains in the direction of the arrow in Fig. 1, due to the rail-flange of tire being forced against the side of rail, as in passing around curves, the tendency being to crowd the tire 14 off the wheel-center. To prevent this I form the tire 14 with an internally-projecting shoulder, 20 21 22 23, which bears against the outer side of the wheel-center, as shown in Fig. 1.

The tire of a car-wheel may break at one or more points from imperfection in the metal or when worn thin by long-continued service, and the pieces, if not properly secured, will be thrown from the center, causing derailment of the car. I prevent this by forming a groove, 18, in the inner side of the tire 14, into which a flange on the periphery of inner disk, 13, is forced, and a groove, 19, in outer side of tire 14, into which a retaining-ring, 15, is forced. A series of bolts, 17, passing through retaining-ring 15, supporting-plates 12 and 13, and also the non-metallic body 11 of the wheel, binds all the parts together in a most substantial manner. In this manner the tire 14 is firmly secured to the wheel-center at each side by a retaining-ring, and also by the shoulder 20 21 22 23, and though it may break in several parts the pieces cannot be torn from the wheel-center, causing derailment of the car.

It is to be observed that the outer series of bolts, 17, not only pass through the metallic annulus 12 of the wheel-center, but the annular wheel-body 11 also; that the tire 14 is of uniform cross-section, and is provided with a shoulder, 20 21 22 23, extending inwardly toward the axis of the wheel and past the periphery of the wheel-center; that the face 22 23 of said shoulder extends still farther toward axis of the wheel and forms the internal angular projection 23 24 25 26 27 28; that said internal angular projection, in conjunction with shoulder 20 21 22 23, forms the rectangular groove 19, facing outwardly, into which retaining-ring 15 is forced; that if the annular groove 19 were of greater diameter than the periphery of the wheel-center the available wearing portion of the tire 14 would be materially reduced.

I am aware that prior to my invention car-wheels have been made in which a body of compressed paper is inclosed by side plates bolted or riveted to a peripheral ring, and that various forms of tire and tire-fastenings have been used; but

What I claim as my invention, and desire to secure by Letters Patent, is—

1. In a car-wheel, a tire having an outwardly-facing annular groove of less diameter than the wheel-center upon which said tire is seated, located in an internal projection of the tire, said projection or a part thereof forming a shoulder which bears against the outer side of the wheel-center, substantially as described.

2. In a car-wheel composed of an independent center and a tire, 14, seated thereon, an outwardly-facing annular groove, 19, of less diameter than periphery of the wheel-center, located in an internal projection of the tire 14 at the outer side or side opposite the rail-flange, said internal projection, or a part thereof, forming a shoulder which bears against the outer side of the wheel-center, substantially as described.

3. In a car-wheel, a tire seated upon an independent wheel-center and provided with an outwardly-facing annular groove of less diameter than the wheel-center, located at the side of tire opposite the rail-flange, and an annular groove in inner or rail-flange side of tire, in combination with the aforesaid wheel-center, a retaining-ring at outer side of the tire, a retaining-ring or flanged retaining-disk at inner side of the tire, and a series of bolts passing through said retaining-rings and the wheel-center, substantially as described.

4. In a car-wheel, the combination of an independent wheel-center and a tire, 14, seated thereon, said tire 14 having at outer side, or side opposite the rail-flange, an outwardly-facing annular groove, 19, of less diameter than diameter of the wheel-center, located in an internal projection or shoulder of the tire, an annular groove, 18, in the rail-flange side of tire, an inner retaining ring or disk, 13, fitted to groove 18, an outer retaining-ring, 15, fitted to groove 19, and a series of bolts, 17, passing through said retaining-rings and the wheel-center, substantially as described.

5. In a car-wheel, a metallic flanged annulus inclosing a non-metallic wheel-body, the flange of annulus forming the periphery thereof, in combination with a tire seated thereon, said tire having an outwardly-facing annular groove of less diameter than the wheel-center, upon which the tire is seated, located in an internal projection of the tire at the side opposite the rail-flange, a retaining-ring fitted to said groove, an inner side plate or disk flanged at periphery to enter a groove in rail-flange side of the tire, a series of retaining-ring bolts, and a central hub, substantially as described.

6. In a car-wheel, a metallic-flanged annulus, 12, in combination with a non-metallic wheel-body, 11, inclosed therein, hub 10, a tire, 14, having an outwardly-facing annular groove, 19, of less diameter than the periphery of wheel-center, located at side opposite the rail-flange in an internal projection of the tire, and a groove, 18, in rail-flange side of tire, an inner side plate or disk, 13, flanged at periphery to enter groove 18, a retaining-ring, 15, and bolts 17, which pass through retaining-ring 15, annulus 12, non-metallic wheel-body 11, and disk 13, substantially as described.

7. In a car-wheel, a wheel-center composed of a central hub, an integral flanged annulus, a non-metallic wheel-body inclosed therein, and an inner side plate or disk flanged at periphery, in combination with a tire having an outwardly-facing annular groove of less diameter than said wheel-center at the side opposite the rail-flange, a groove located in the rail-flange side, into which the flange of inner disk enters, a retaining-ring fitted to the groove at side opposite rail-flange, and a series of retaining-ring bolts passing through the non-metallic center, substantially as described.

8. In a car-wheel, a tire, 14, having retaining-ring grooves 18 and 19 in opposite sides, the groove 19 being of less diameter than the seat of tire, in combination with a wheel-center composed of a central hub, inner flanged disk, 13, non-metallic wheel-body 11, inclosed in flanged annulus 12, bolts 16, retaining-ring 15, and bolts 17, passing through non-metallic wheel-body 11, between axis of the wheel and the metallic tire-seat 12', substantially as described.

9. In a car-wheel, the combination of a central hub, inner flanged disk, 13, bolts 16, retaining-ring 15, a tire, 14, having a groove, 18, in inner side of greater diameter, and a groove, 19, near the outer side of less diameter, than the periphery of the wheel-center, bolts 17, and flanged annulus 12, the flange 12' of which passes between bolts 17 and the tire 14, which is seated thereon, substantially as described.

10. In a car-wheel, a tire made of less internal diameter at side opposite the rail-flange than the wheel-center upon which it is seated, thereby forming a shoulder which bears against side of wheel-center, a projection of angular cross-section extending from said shoulder inwardly toward axis of the wheel and then outwardly, thereby forming, in conjunction with the said shoulder, an annular groove facing outwardly and provided with a groove in the rail-flange side of tire, a wheel-center, retaining-rings fitted to the aforesaid grooves in tire, and a series of retaining-ring bolts, substantially as described.

11. In a car-wheel, the combination of a central hub, a non-metallic wheel-body, 11, flanged annulus 12, retaining-ring 15, inner flanged disk, 13, bolts 16, bolts 17, and tire 14, having an internally-projecting shoulder, 20 21 22 23, an internally-projecting angular rib, 23 24 25 26 27 28, which forms, in conjunction with shoulder 20 21 22 23, an outwardly-facing annular groove, 19, and in rail-flange side of tire a groove, 18, substantially as described.

12. The combination, in a car-wheel, of a non-metallic wheel-body, 11, integral flanged annulus 12, inner flanged retaining-disk, 13, hub 10, bolts 16, retaining-ring 15, a series of bolts, 17, and a tire, 14, having annular groove 18 in rail-flange side and at opposite side an internally-projecting shoulder, 20 21 22 23, bearing against outer side of the wheel-center, an internal angular projection, 23 24 25 26 27 28, which, in conjunction with shoulder 20 21 22 23, forms an outwardly-facing annular groove, 19, of less diameter than the periphery of the wheel-center, substantially as described, and for the purposes set forth.

WILLIAM G. RICHARDS.

Witnesses:
JAMES S. GREVES,
WILLIAM S. BLITZ.